United States Patent
Everingham et al.

(10) Patent No.: US 6,675,572 B2
(45) Date of Patent: Jan. 13, 2004

(54) VALVE INCLUDING A RECIRCULATION CHAMBER

(75) Inventors: Gary Everingham, Chatham (CA); Cristian Tofan-Petre, Tournefeuille (FR); Thomas Maciejowski, Chatham (CA)

(73) Assignee: Siemens Automotive Inc. (CA)

( * ) Notice: Subject to any disclaimer, the term of this patent is extended or adjusted under 35 U.S.C. 154(b) by 0 days.

(21) Appl. No.: 09/951,907

(22) Filed: Sep. 14, 2001

(65) Prior Publication Data

US 2002/0035920 A1 Mar. 28, 2002

Related U.S. Application Data

(60) Provisional application No. 60/232,345, filed on Sep. 14, 2000.

(51) Int. Cl.$^7$ .................................................. F01N 3/00
(52) U.S. Cl. ........................................... 60/278; 60/288
(58) Field of Search ............................ 137/625.43, 311; 60/278, 287, 288, 296

(56) References Cited

U.S. PATENT DOCUMENTS

| | | | |
|---|---|---|---|
| ,824,166 A | * | 6/1906 | Aiken ........................ 137/311 |
| 1,267,898 A | * | 5/1918 | Parish ........................ 137/311 |
| 1,548,419 A | * | 8/1925 | Isley ........................... 137/311 |
| 2,817,360 A | * | 12/1957 | Asker ..................... 137/625.43 |
| 2,898,202 A | * | 8/1959 | Houdry et al. ................. 60/296 |
| 3,172,251 A | * | 3/1965 | Johnson ........................ 60/278 |
| 3,189,417 A | * | 6/1965 | Houdry et al. ................. 60/296 |
| 3,191,628 A | * | 6/1965 | Kirkwood et al. ..... 137/625.43 |
| 4,211,075 A | | 7/1980 | Ludecke et al. |
| 4,345,431 A | | 8/1982 | Suzuki et al. |
| 4,404,798 A | | 9/1983 | Takagi et al. |
| 4,535,588 A | | 8/1985 | Sato et al. |
| 4,720,972 A | | 1/1988 | Rao et al. |
| 4,848,083 A | | 7/1989 | Goerlich |
| 4,936,093 A | | 6/1990 | Goerlich |
| 4,945,722 A | | 8/1990 | Goerlich |
| 5,045,097 A | | 9/1991 | Langen |
| 5,085,049 A | | 2/1992 | Rim et al. |
| 5,687,764 A | * | 11/1997 | Tanaka et al. ......... 137/625.43 |
| 5,988,219 A | * | 11/1999 | Larsen ................. 137/625.43 |
| 6,010,547 A | | 1/2000 | Jeong et al. |
| 6,510,686 B2 | * | 1/2003 | Kimura et al. ................. 60/296 |
| 6,532,735 B2 | * | 3/2003 | Luerch ......................... 60/278 |

* cited by examiner

*Primary Examiner*—John C Fox

(57) ABSTRACT

A method of diverting flow with a valve through a first filter and a second filter to purify exhaust gas with at least one of the filters and to regenerate at least one of the filters with the exhaust gas. Positioning the valve in a first operative position purifies the exhaust gas with the first filter and regenerates the second filter with the exhaust gas. Positioning the valve in a second operative position that is different that the first operative position purifies the exhaust gas with the second filter and regenerates the first filter with the exhaust gas. The method can be achieved by a valve for an exhaust system that including a body and a flow inhibitor. The body defines a volume and has a first inlet, a second inlet, a recirculation chamber, and an outlet chamber in fluid communication with the volume. The flow inhibitor is disposed in the volume and is positionable in at least first and second operative positions, the first operative position defining flow paths from the first inlet to the outlet chamber and from the second inlet to the recirculation chamber, the second operative position defining flow paths from the second inlet to the outlet chamber and from the first inlet to the recirculation chamber.

6 Claims, 3 Drawing Sheets

VALVE INCLUDING A RECIRCULATION CHAMBER

CLAIM FOR PRIORITY

This application claims priority to U.S. provisional application No. 60/232,345 (Attorney Docket No. 00 P7886 US,) entitled EGR "Y" Valve, filed Sep. 14, 2000, the disclosure of which is incorporated herein by reference in its entirety.

FIELD OF THE INVENTION

The invention relates to a valve, and more particularly to a valve for directing flow. The valve routes a portion of an input flow to a specified valve chamber regardless of the flow path to the chamber. When the valve is used in an exhaust gas circulation system, the valve routes a portion of the exhaust gas produced by an engine to a recirculation chamber of the valve that is in fluid communication with the engine.

BACKGROUND OF THE INVENTION

It is known to use a plurality of trap mufflers to filter exhaust gas in an exhaust system. In a known exhaust system, exhaust gas is routed through a first trap muffler to purify the exhaust. When the first trap muffler accumulates an amount of soot such that the first trap muffler can no longer effectively filter the exhaust, a complex series of valves routes the exhaust gas through a second trap muffler. While the second trap muffler is purifying the exhaust, the first trap muffler enters a regeneration phase to burn off the accumulated soot.

During the regeneration phase of the first trap muffler, air is received through an inlet and is routed through the first trap muffler, through an exhaust gas recirculation (EGR) valve, and back to the engine intake manifold. The flowing exhaust carries the oxidized soot from the first trap muffler and delivers it to an intake manifold of the engine where it is recirculated as "EGR" gas. After a sufficient amount of soot is removed from the first trap muffler, the first trap muffler is regenerated and again able to purify the exhaust gas.

When the second trap muffler accumulates an amount of soot such that the exhaust pressure increases beyond an acceptable level, the series of valves route the exhaust through the regenerated first trap muffler for purifying. The second trap muffler enters a regeneration phase, wherein exhaust received from an inlet carries the oxidized soot to the intake manifold of the engine through a second EGR valve. After a sufficient amount of soot is removed by oxidation, the second trap muffler is regenerated and again able to purify the exhaust gas. By this arrangement, it is believed that the known system permits continuous purifying of the exhaust gas produced by the engine.

However, it is believed that the known system suffers from a number of disadvantages related to the complex series of valves and the use of multiple EGR valves, resulting in increased fabrication and evaluation costs. Thus, for these reasons, it is desirable to provide a valve routing exhaust gas for regenerating the filters to a single chamber regardless of the flow path to the chamber, thereby permitting the use of a single EGR valve in the exhaust system.

SUMMARY OF THE INVENTION

The invention provides a method of diverting flow with a valve through a first filter and a second filter to purify exhaust gas with at least one of the filters and to regenerate at least one of the filters with the exhaust gas. Positioning the valve in a first operative position purifies the exhaust gas with the first filter and regenerates the second filter with the exhaust gas. Positioning the valve in a second operative position that is different than the first operative position purifies the exhaust gas with the second filter and regenerates the first filter with the exhaust gas.

The invention also provides a method of routing exhaust gas from an engine through a single Y-valve to both an outlet and a return to the engine that includes flowing a first portion of the exhaust gas through a recirculation section of the valve in fluid communication with the engine and flowing a second portion of the exhaust gas through an output section of the valve in fluid communication with the outlet.

The invention also provides a valve for an exhaust system that routes a portion of an exhaust gas back to the system. The valve body defines a volume and has a first inlet, a second inlet, a recirculation chamber, and an outlet chamber in fluid communication with the volume. A flow inhibitor is disposed in the volume and positionable between at least first and second operative positions, the first operative position defining flow paths from the first inlet to the outlet chamber and from the second inlet to the recirculation chamber, the second operative position defining flow paths from the second inlet to the outlet chamber and from the first inlet to the same recirculation chamber.

The invention also provides a motor vehicle having an exhaust treatment system that includes a valve for recirculating a portion of an exhaust gas. The automobile includes an engine that produces the exhaust gas. An exhaust gas coupling includes an input and first and second outputs, the input in fluid communication with the engine to receive the exhaust gas. A first filter is in fluid communication with first output of the coupling. A second filter is in fluid communication with the second output of the coupling. The valve defines a volume and includes a first inlet, a second inlet, a recirculation chamber, and an outlet in fluid communication with the volume. The first inlet is in communication with the first filter, and the second inlet is in communication with the second filter. The valve is positionable between at least a first operative position to purify the exhaust gas with the first filter and to regenerate the second filter with the exhaust gas and a second operative position to regenerate the first filter with the exhaust gas and to purify the exhaust gas with the second filter.

BRIEF DESCRIPTIONS OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
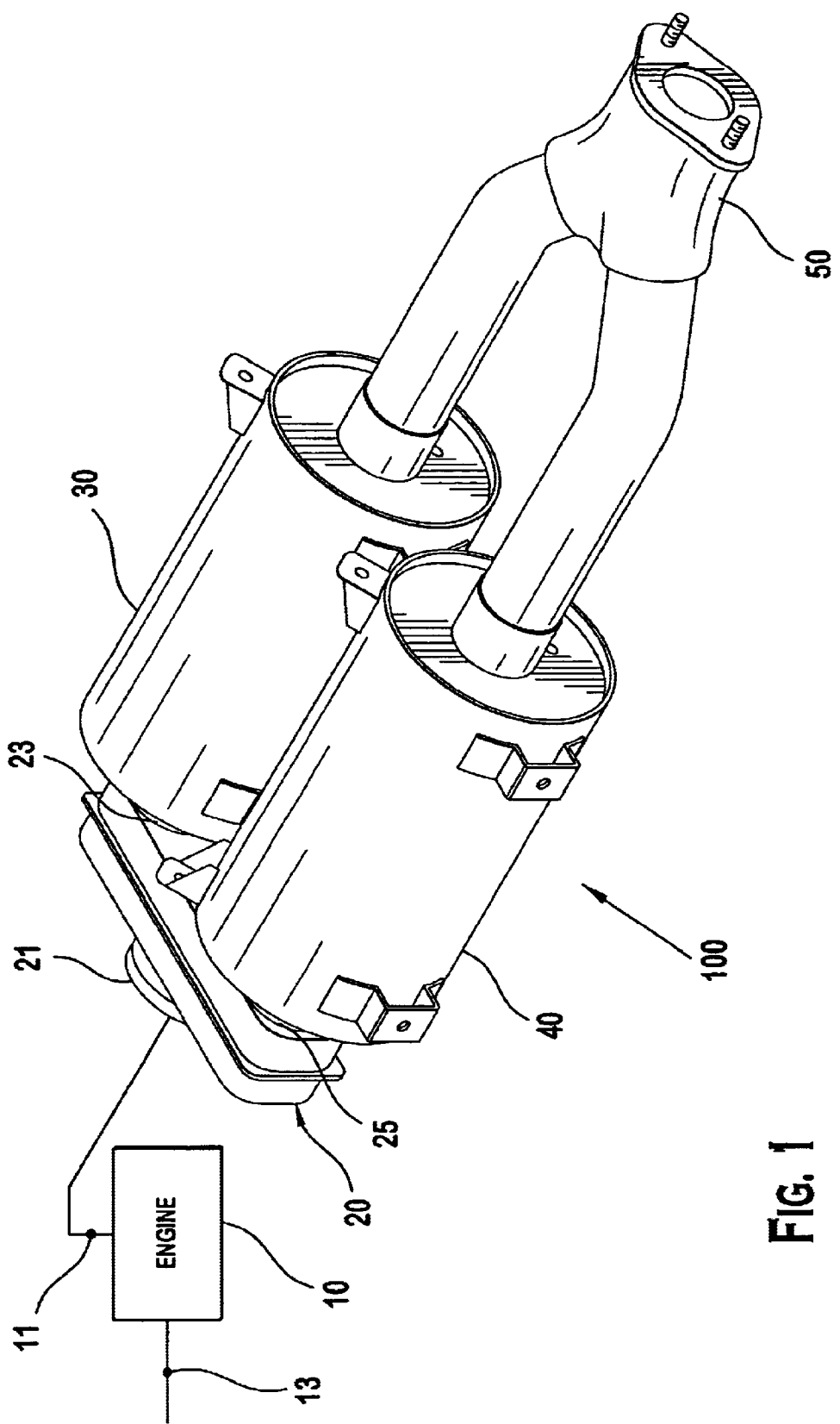
FIG. 1 shows an isometric view of an exhaust system of the invention.

FIG. 1 shows a preferred embodiment of an exhaust system. The exhaust system can be provided within a motor vehicle, and in particular, a motor vehicle that operated with a diesel engine. Alternatively, the exhaust system can be provided in an automobile. The exhaust system includes a valve for directing flow from multiple flow paths to a single recirculation chamber. As shown in the figures, the exhaust system can a valve to route portions of an exhaust gas to an outlet and back to an engine. Although the figures illustrate the use of the valve in the preferred embodiment of the exhaust system, it should be understood that the valve can have applications outside of an exhaust system. In particular, the valve can be used in any flow system where a portion of a fluid is recirculated to an origin of the fluid.

As shown in FIG. 1, the preferred embodiment of the exhaust gas circulation system 100 includes an engine 10 producing an exhaust gas as a by-product of combustion. The exhaust gas that is output from the engine 10 is routed through an exhaust gas coupling 20. Portions of the exhaust gas flows through each of the first and second filters or trap mufflers 30 and 40, respectively. Depending on an operative position of the flow directing valve 50, portions of the exhaust gas are purified by one of the filters 30, 40, and regenerate the other one of the filters 30, 40. The purified exhaust gas is output from the exhaust system 100. The regenerative exhaust gas is routed through a return valve 60 back to the engine 10. Disposition of the valve 50 to another operative position routes the exhaust gas to be purified through the previously regenerated filter and routes the regenerative exhaust gas to the other filter. In the preferred embodiment, the valve 50 includes a single chamber for receiving the regenerative exhaust gas, such that a single return valve 60 can be used to route all the regenerative exhaust gas back to the engine 10.

The engine 10 provides an outlet for the exhaust gas and an inlet for receiving exhaust gas that is returned for use in the combustion process. The engine can be an internal combustion engine. FIG. 1 shows the preferred embodiment of the exhaust system 100 where the engine 10 includes an engine output 11 and an engine input 13. The engine input 13 can include an intake manifold (not shown) for use in the combustion process with the regenerative exhaust gas.

The exhaust gas coupling 20 divides the exhaust gas into cleaning and regenerative portions. As shown in the preferred embodiment of FIG. 1, the coupling 20 is in the form of a Y-connector and includes an input 21 for receiving the exhaust gas from the engine output 11. The coupling 20 also includes first and second outputs 23, 25 for delivering the portions of the exhaust gas to the first and second filters 30, 40, respectively.

The first and second filters 30, 40, collect soot in order to purify a major portion of the exhaust gas. When the filters 30, 40, accumulate an amount of soot such that the exhaust pressure increases beyond a predetermined limit, the filters can be regenerated by igniting the soot from an electric heat source within the filter to oxidize and remove the soot. The disposition of the flow directing valve 50 to differing operative positions determines which filter is purifying the exhaust gas and which is in the regenerative phase. It should be understood that when the valve 50 defines a flow path through a particular filter to the output of the system, the particular filter is being used to purify the exhaust gas, and when the flow path through a particular filter is directed to the single chamber in the valve 50 that is in fluid communication with the engine 10, the particular filter is in the regeneration phase.

Figure 2:
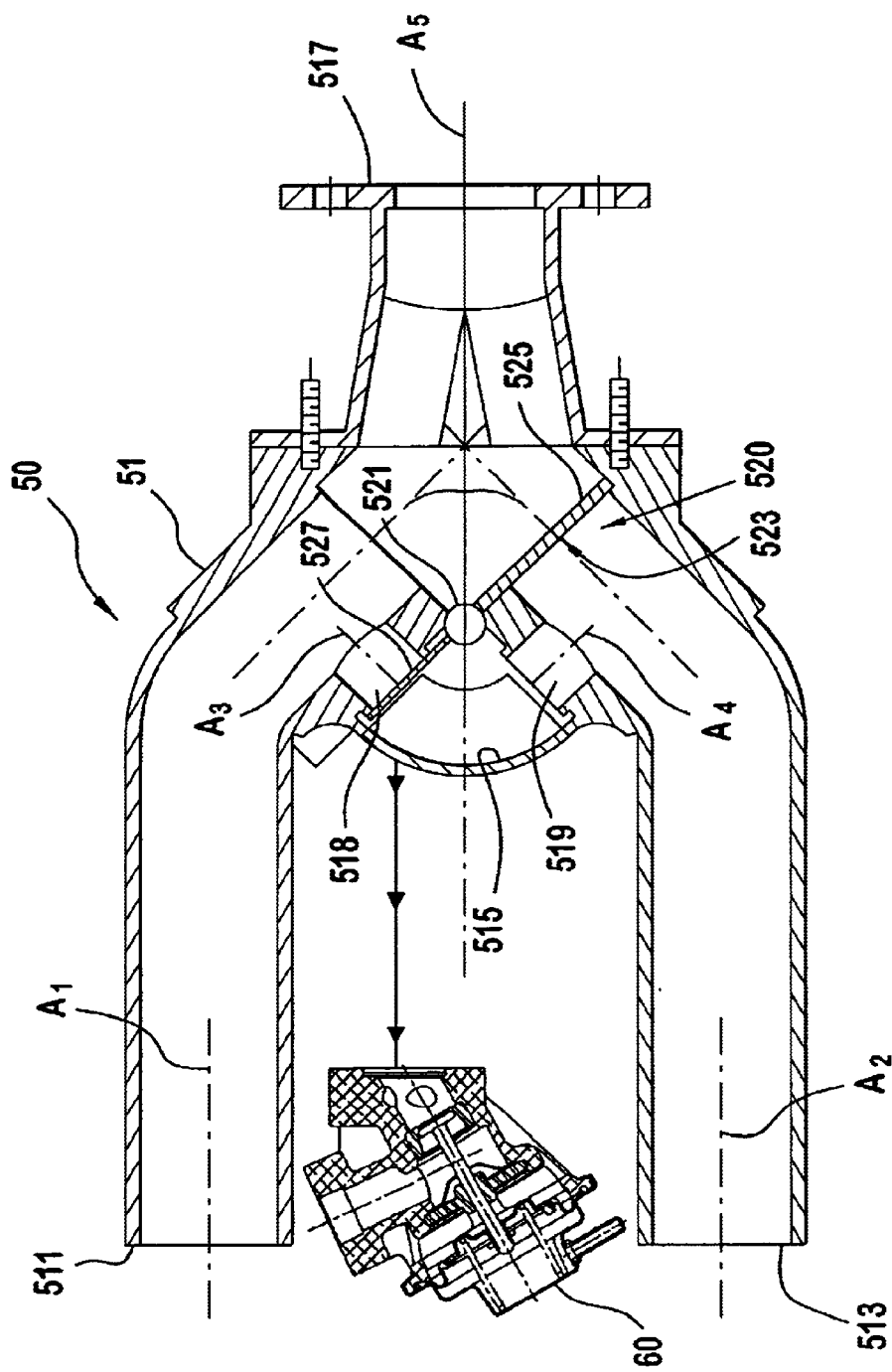
FIG. 2 shows a cross section view of a flow diverting valve of the exhaust system of FIG. 2.

FIG. 2 shows the flow directing valve 50. Although the preferred embodiment is illustrated in the figures, it should be understood that a broad embodiment of the flow directing valve 50 routes a portion of the exhaust gas back to the engine 10 through a single chamber, regardless of the flow path that delivers the exhaust gas to the single chamber. In the preferred embodiment, the valve 50 is positionable to first and second positions that determine which one of the filters 30, 40, purifies the exhaust gas and which other filter is in the regenerative phase. However, it should be understood that the valve 50 can also be positioned in intermediate positions routing some portion of the exhaust gas through both of the filters 30, 40, to purify the exhaust gas and some portion of the gas through both filters to regenerate the filters.

The flow diverting valve 50 includes a body 51. Although the preferred embodiment is a Y-valve, it should be understood that the body 51 can be any other configuration, for example, such as L-shaped or C-shaped, so long as a portion of the exhaust gas is routed to a single chamber regardless of the flow path delivering the exhaust gas to the single chamber. FIGS. 1 and 2 show the preferred embodiment of the Y-valve as a unitary structure. The unitary structure can be made from a monolithic structure or can be made from a collection of components that are connected together. The collection of components can be either directly or indirectly connected, so long as the components are disposed within the exhaust stream between the filters 30, 40, and the outlet, and the components are positionable between at least a first operative and second operative positions, where the first operative position is used to purify the exhaust gas with the first filter and to regenerate the second filter with the exhaust gas and, and the second operative position is used to regenerate the first filter with the exhaust gas and to purify the exhaust gas with the second filter.

The body 51 includes first and second inlets 511, 513 for receiving portions of the exhaust from the filters 30, 40. Each of the first and second inlets 511, 513 includes a respective exterior wall and an interior wall, the interior walls defining flow paths through the body 51. The interior wall extend along and are disposed about respective axes A1 and A2. The axes are about parallel to one another, such that the initial flow paths through each of the first and second inlets 511, 513, are about parallel.

Terminal flow paths through each of the first and second inlets 511, 513, are defined by portions of the respective interior walls extending along intersecting portions of their respective axes A1 and A2. As shown in FIG. 2, the axes intersect at an angle in the range of about 80 to about 90 degrees, and in particular, preferably, at about 85 degrees.

The recirculation chamber 515 is in fluid communication with both of the inlets 511, 513, to deliver exhaust gas back to the engine 10, regardless of the flow path that delivers the exhaust gas to the chamber 515. In the preferred embodiment, as shown in the figures, the recirculation chamber 515 is disposed between the terminal flow path portions of the first and second inlets 511, 513. The recirculation chamber 515 is defined by the exterior walls of the terminal flow path portions, and arcuate interior and exterior walls that are coaxial with one another, such that the chamber 515 is a portion of a right cylinder. As shown in FIG. 2, the portion of the right cylinder that defines the interior of the chamber 515 spans an arc in the range of about 80 to about 90 degrees, and in particular, preferably, about 85 degrees.

First and second chamber inlets 518, 519, provide flow paths from the inlets to the recirculation chamber 515. As shown in the FIG. 2, the chamber inlets 518, 519, extend along and are disposed about axes A3 and A4 that are about perpendicular to the respective terminal flow portions. The chamber inlets 518, 519, have a cross-sectional area that is, preferably, about ⅓ to ½ of the cross-sectional area of the terminal flow portions.

The outlet chamber 517 provides an exit for the purified exhaust gas from the exhaust system 100. As shown in FIG. 2, the outlet chamber 517 is defined by a flanged plate and projections of the terminal flow portions along their respective axes. The flanged plate includes an exterior wall including first and second angled portions extending along and disposed about an axis A5, and an interior wall having respective first and second angled portions. The interior wall and exterior wall extend along and are disposed about the axis A5 that is about parallel with the initial flow path axes A1 and A2 of the inlets 511, 513.

In the preferred embodiment shown in FIG. 2, the flow inhibitor 520 is disposed in the volume and positionable to determine which one of the filters 30, 40, purifies the exhaust gas and which other filter is in the regenerative phase. However, it should be understood that the inhibitor 520 can be disposed in intermediate positions that routes some portion of the exhaust gas through both of the filters 30, 40, to purify the exhaust gas and some portion of the gas through both filters to regenerate the filters. The flow inhibitor 520 can be any member that has the requisite physical characteristics that, when appropriately positioned, allows for the controlled flow of exhaust gas through the valve 50. Thus, the flow inhibitor 520 can be in the form of, for example, a plate, a ball, a cylindrical member, or any other geometric configuration. In the preferred embodiment, the flow inhibitor 520 is a solid plate for diverting flow. However, it is further understood that the flow inhibitor 520 can be a porous member permitting some percentage of flow through the material of the inhibitor 520. The flow inhibitor 520 can be any material that is suited for exposure within an exhaust system, such as, but not limited to, metals, plastics, and ceramics. The flow inhibitor 520 can be positioned by various drivers, such as electrical, mechanical, and pneumatic actuation, or any other suitable drive device that can appropriately position the flow inhibitor.

Figure 3:
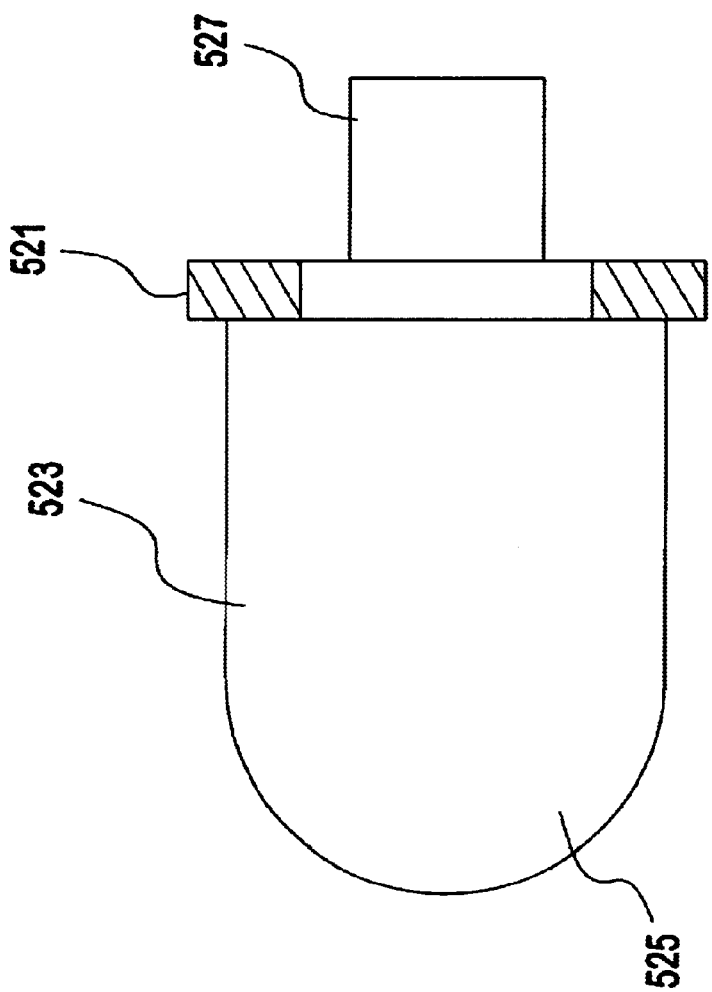
FIG. 3 shows a partial cross-sectional view of a flow inhibitor of the valve of FIG. 2.

The preferred embodiment of the flow inhibitor 520 shown in FIGS. 2 and 3 includes a shaft 521 having a void and a plate 523 disposed in the void. The plate 523 includes a first end 525 sized and shaped to effectively prevent flow from the terminal portions of the inlets 511, 513 to the outlet chamber 517. The plate 523 also includes a second end 527 sized and shaped to prevent flow from the chamber inlets 518, 519 to the regenerative chamber 515, when the end 527 is disposed in the chamber 515.

The return valve 60 routes the flow of the regenerative exhaust from the specified chamber of the flow directing valve 50. As shown in FIGS. 1 and 2, the return valve 60 flows the specified portion of the exhaust gas to the engine input 13, such that the regenerative exhaust gas can be used in the NOx reduction process of the engine 10. Since regenerative exhaust gas from both filters 30, 40, is routed to the regenerative chamber 515 of the valve flow directing valve 50, the system 100 only requires the use of a single return valve 60 to route the exhaust gas to the engine 10. As shown in FIG. 2, the return valve can be an exhaust gas recirculation (EGR) valve, and can be for example a needle-type or a rotary-type valve, either of which can electrically or pneumatically (vacuum) actuated. The return valve 60 can be installed contiguous with the flow directing valve 50, and can be installed separate from the valve 50.

In the preferred embodiment shown in FIG. 2, the return valve 60 is a pneumatically actuated pintle-type aluminum base EGR valve. As shown in FIG. 1, the aluminum EGR valve includes a pintle that is positionable to permit and prohibit flow through the return valve 60. A sealed pressure chamber responds to negative pressures to urge a membrane in a direction away from a seat, thereby permitting flow through the return valve 60. A return spring biases the pintle toward the seat, such that flow through the valve can be prohibited.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it will have the fall scope defined by the language of the following claims, and equivalents thereof.

What is claimed is:

1. A valve for an exhaust system including first and second exhaust filters purifying exhaust gas from an engine, the exhaust gas being recirculated to an intake of the engine by a return device, the valve comprising:

a body defining a volume and having a first inlet, a second inlet, a recirculation chamber, and an outlet chamber in fluid communication with the volume, the first inlet communicating the exhaust gas from the first exhaust filter to the volume, the second inlet communicating the exhaust gas from the second exhaust filter to the volume, and the recirculation chamber communicating the exhaust gas to the return device; and a flow inhibitor disposed in the volume and positionable in at least first and second operative positions, the first operative position defining flow paths from the first inlet to the outlet chamber and from the second inlet to the recirculation chamber, the second operative position defining flow paths from the second inlet to the outlet chamber and from the first inlet to the recirculation chamber.

2. The valve according to claim 1, wherein the flow inhibitor comprises a shaft including a void and a plate disposed in the void.

3. The valve according to claim 1, wherein the body further includes a first recirculation inlet defining a flow path between the first inlet and the recirculation chamber and a second recirculation inlet defining a flow path between the second inlet and the recirculation chamber, one of the first and second recirculation inlets defining a cross-sectional area that is about ½ of a cross-sectional area of one of the first and second inlets.

4. The valve according to claim 3, wherein first and second inlets each comprise initial inlet portions and terminal inlet portions, the initial inlet portions extending along portion of their respective axes that are substantially parallel.

5. The valve according to claim 4, wherein each of the terminal inlet portions extends along portions of their respective axes that interest one another.

6. The valve according to claim 5, wherein the recirculation inlets extend about perpendicular to their respective terminal inlet portions.

\* \* \* \* \*